United States Patent
Iyigun et al.

(10) Patent No.: US 9,626,126 B2
(45) Date of Patent: Apr. 18, 2017

(54) POWER SAVING MODE HYBRID DRIVE ACCESS MANAGEMENT

(71) Applicant: Microsoft Technology Licensing, LLC, Redmond, WA (US)

(72) Inventors: Mehmet Iyigun, Kirkland, WA (US); Yevgeniy M. Bak, Redmond, WA (US); Eric M. Bluestein, Seattle, WA (US); Robin A. Alexander, Woodinville, WA (US); Andrew M. Herron, Redmond, WA (US); Xiaozhong Xing, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 979 days.

(21) Appl. No.: 13/869,622

(22) Filed: Apr. 24, 2013

(65) Prior Publication Data

US 2014/0325166 A1    Oct. 30, 2014

(51) Int. Cl.
*G06F 12/00* (2006.01)
*G06F 13/00* (2006.01)
(Continued)

(52) U.S. Cl.
CPC ............ *G06F 3/068* (2013.01); *G06F 1/3268* (2013.01); *G06F 3/0625* (2013.01);
(Continued)

(58) Field of Classification Search
CPC ......... G06F 3/068; G06F 3/0625; G06F 12/14
(Continued)

(56) References Cited

U.S. PATENT DOCUMENTS

| 4,815,028 A | 3/1989 | Saitoh |
| 5,123,104 A | 6/1992 | Levine et al. |

(Continued)

FOREIGN PATENT DOCUMENTS

| BR | PI0711731 | 11/2011 |
| CN | 1447242 | 10/2003 |

(Continued)

OTHER PUBLICATIONS

"Foreign Office Action", TW Application No. 096113112, (May 22, 2013), 6 pages.

(Continued)

*Primary Examiner* — Charles Rones
*Assistant Examiner* — Sidney Li

(57) ABSTRACT

A hybrid drive includes multiple parts: a performance part (e.g., a flash memory device) and a base part (e.g., a magnetic or other rotational disk drive). A drive access system, which is typically part of an operating system of a computing device, issues input/output (I/O) commands to the hybrid drive to store data to and retrieve data from the hybrid drive. The drive access system supports multiple priority levels and obtains priority levels for groups of data identified by logical block addresses (LBAs). The LBAs read while the device is operating in a power saving mode are assigned a priority level that is at least the lowest of the multiple priority levels supported by the device, increasing the likelihood that LBAs read while the device is operating in the power saving mode are stored in the performance part of the hybrid drive.

20 Claims, 6 Drawing Sheets

(51) Int. Cl.
   *G06F 13/28* (2006.01)
   *G06F 3/06* (2006.01)
   *G06F 12/14* (2006.01)
   *G06F 1/32* (2006.01)

(52) U.S. Cl.
   CPC .......... *G06F 3/0647* (2013.01); *G06F 3/0653* (2013.01); *G06F 3/0685* (2013.01); *G06F 12/14* (2013.01); *Y02B 60/1246* (2013.01); *Y02B 60/32* (2013.01)

(58) Field of Classification Search
   USPC ................................................ 711/158, 165
   See application file for complete search history.

(56) References Cited

U.S. PATENT DOCUMENTS

| | | | |
|---|---|---|---|
| 5,307,497 A | 4/1994 | Feigenbaum et al. |
| 5,412,612 A | 5/1995 | Oyama |
| 5,420,998 A | 5/1995 | Horning |
| 5,475,827 A | 12/1995 | Lee et al. |
| 5,530,828 A | 6/1996 | Kaki et al. |
| 5,535,357 A | 7/1996 | Moran et al. |
| 5,581,505 A | 12/1996 | Lee |
| 5,592,630 A | 1/1997 | Yamagami et al. |
| 5,598,370 A | 1/1997 | Niijima et al. |
| 5,627,533 A | 5/1997 | Clark |
| 5,630,093 A | 5/1997 | Holzhammer et al. |
| 5,634,050 A | 5/1997 | Krueger et al. |
| 5,636,355 A | 6/1997 | Ramakrishnan et al. |
| 5,663,901 A | 9/1997 | Wallace et al. |
| 5,672,533 A | 9/1997 | Arima et al. |
| 5,682,497 A | 10/1997 | Robinson |
| 5,701,433 A | 12/1997 | Moriarty et al. |
| 5,734,816 A | 3/1998 | Niijima et al. |
| 5,745,418 A | 4/1998 | Ma et al. |
| 5,758,174 A | 5/1998 | Crump et al. |
| 5,799,168 A | 8/1998 | Ban |
| 5,799,305 A | 8/1998 | Bortvedt et al. |
| 5,801,650 A | 9/1998 | Nakayama |
| 5,813,038 A | 9/1998 | Thome et al. |
| 5,822,781 A | 10/1998 | Wells et al. |
| 5,860,083 A | 1/1999 | Sukegawa |
| 5,867,417 A | 2/1999 | Wallace et al. |
| 5,867,641 A | 2/1999 | Jenett |
| 5,887,198 A | 3/1999 | Houlberg et al. |
| 5,912,848 A | 6/1999 | Bothwell |
| 5,937,425 A | 8/1999 | Ban |
| 5,956,473 A | 9/1999 | Ma et al. |
| 5,960,434 A | 9/1999 | Schimmel |
| 5,973,609 A | 10/1999 | Schoch |
| 5,973,964 A | 10/1999 | Tobita et al. |
| 5,974,426 A | 10/1999 | Lee et al. |
| 5,974,546 A | 10/1999 | Anderson |
| 5,987,563 A | 11/1999 | Itoh et al. |
| 5,991,778 A | 11/1999 | Starek et al. |
| 6,000,006 A | 12/1999 | Bruce et al. |
| 6,011,741 A | 1/2000 | Wallace et al. |
| 6,014,724 A | 1/2000 | Jenett |
| 6,018,433 A | 1/2000 | Thayne et al. |
| 6,018,806 A | 1/2000 | Cortopassi et al. |
| 6,026,027 A | 2/2000 | Terrell, II et al. |
| 6,061,788 A | 5/2000 | Reynaud et al. |
| 6,070,174 A | 5/2000 | Starek et al. |
| 6,073,232 A | 6/2000 | Kroeker et al. |
| 6,078,999 A | 6/2000 | Raju et al. |
| 6,101,601 A | 8/2000 | Matthews et al. |
| 6,111,815 A | 8/2000 | TaKeda |
| 6,122,745 A | 9/2000 | Wong-Insley |
| 6,148,349 A | 11/2000 | Chow et al. |
| 6,192,488 B1 | 2/2001 | Li |
| 6,198,660 B1 | 3/2001 | Rolandi |
| 6,208,581 B1 | 3/2001 | You |
| 6,209,088 B1 | 3/2001 | Reneris |
| 6,223,284 B1 | 4/2001 | Novoa et al. |
| 6,230,285 B1 | 5/2001 | Sadowsky et al. |
| 6,253,281 B1 | 6/2001 | Hall |
| 6,279,069 B1 | 8/2001 | Robinson et al. |
| 6,308,265 B1 | 10/2001 | Miller |
| 6,321,234 B1 | 11/2001 | Debrunner |
| 6,336,158 B1 | 1/2002 | Martwi |
| 6,347,051 B2 | 2/2002 | Yamagami et al. |
| 6,366,530 B1 | 4/2002 | Sluiter et al. |
| 6,377,500 B1 | 4/2002 | Fujimoto et al. |
| 6,380,581 B1 | 4/2002 | Noble et al. |
| 6,415,350 B2 | 7/2002 | Asoh |
| 6,418,506 B1 | 7/2002 | Pashley et al. |
| 6,438,750 B1 | 8/2002 | Anderson |
| 6,456,517 B2 | 9/2002 | Kim et al. |
| 6,493,807 B1 | 12/2002 | Martwick |
| 6,496,854 B1 | 12/2002 | Hagersten et al. |
| 6,510,488 B2 | 1/2003 | Lasser |
| 6,539,456 B2 | 3/2003 | Stewart |
| 6,564,285 B1 | 5/2003 | Mills et al. |
| 6,606,707 B1 | 8/2003 | Hirota et al. |
| 6,609,182 B1 | 8/2003 | Pedrizetti et al. |
| 6,611,919 B1 | 8/2003 | Matsuya et al. |
| 6,621,746 B1 | 9/2003 | Aasheim et al. |
| 6,628,537 B1 | 9/2003 | Wallace et al. |
| 6,633,956 B1 | 10/2003 | Mitani |
| 6,643,730 B2 | 11/2003 | Okumura et al. |
| 6,670,234 B2 | 12/2003 | Hsu et al. |
| 6,799,231 B2 | 9/2004 | Hsin et al. |
| 6,804,146 B2 | 10/2004 | Johnson |
| 6,839,823 B1 | 1/2005 | See et al. |
| 6,850,995 B1 | 2/2005 | Shishizuka et al. |
| 6,859,068 B1 | 2/2005 | Trivedi et al. |
| 6,892,270 B2 | 5/2005 | Roohparvar |
| 6,901,499 B2 | 5/2005 | Aasheim et al. |
| 6,910,106 B2 | 6/2005 | Sechrest et al. |
| 6,928,512 B2 | 8/2005 | Ayukawa et al. |
| 6,968,450 B1 | 11/2005 | Rothberg et al. |
| 7,010,662 B2 | 3/2006 | Aasheim et al. |
| 7,017,037 B2 | 3/2006 | Fortin et al. |
| 7,062,618 B2 | 6/2006 | Tsunoda et al. |
| 7,082,495 B2 | 7/2006 | DeWhitt et al. |
| 7,082,512 B2 | 7/2006 | Aasheim et al. |
| 7,093,101 B2 | 8/2006 | Aasheim et al. |
| 7,100,040 B2 | 8/2006 | Fortin et al. |
| 7,107,444 B2 | 9/2006 | Fortin et al. |
| 7,110,437 B2 | 9/2006 | Oates et al. |
| 7,162,549 B2 | 1/2007 | Mambakkam et al. |
| 7,185,155 B2 | 2/2007 | Sechrest et al. |
| 7,186,147 B1 | 3/2007 | Chou et al. |
| 7,203,830 B2 | 4/2007 | Fortin et al. |
| 7,360,022 B2 | 4/2008 | Tian et al. |
| 7,613,880 B2 | 11/2009 | Miura et al. |
| 7,698,513 B2 | 4/2010 | Sechrest et al. |
| 7,716,411 B2 | 5/2010 | Panabaker et al. |
| RE42,727 E | 9/2011 | Kang |
| 8,082,384 B2 | 12/2011 | Sareen et al. |
| 8,151,064 B2 | 4/2012 | Lee |
| 8,195,878 B2 | 6/2012 | Mittendorff et al. |
| 8,307,014 B2 | 11/2012 | Mehrotra et al. |
| 8,423,700 B2 | 4/2013 | Panabaker et al. |
| 8,473,670 B2 | 6/2013 | Sareen et al. |
| 8,812,744 B1 | 8/2014 | Iyigun et al. |
| 8,990,441 B2 | 3/2015 | Iyigun et al. |
| 9,323,460 B2 | 4/2016 | Iyigun et al. |
| 2002/0083264 A1* | 6/2002 | Coulson ............... G06F 3/0613 711/112 |
| 2003/0014603 A1* | 1/2003 | Sasaki .................. G06F 12/126 711/158 |
| 2003/0070065 A1 | 4/2003 | Fleming |
| 2003/0165076 A1 | 9/2003 | Gorobets et al. |
| 2003/0177305 A1 | 9/2003 | Hetrick |
| 2003/0206478 A1 | 11/2003 | Ayukawa et al. |
| 2003/0212855 A1 | 11/2003 | Sakaguchi et al. |
| 2003/0212857 A1 | 11/2003 | Pacheco et al. |
| 2003/0217299 A1 | 11/2003 | Neuman et al. |
| 2004/0083405 A1 | 4/2004 | Chang et al. |
| 2004/0093463 A1 | 5/2004 | Shang |
| 2004/0117441 A1 | 6/2004 | Liu et al. |
| 2005/0027928 A1 | 2/2005 | Avraham et al. |

(56) References Cited

U.S. PATENT DOCUMENTS

| | | |
|---|---|---|
| 2005/0036387 A1 | 2/2005 | Seal et al. |
| 2005/0044348 A1 | 2/2005 | O'Connell |
| 2005/0102444 A1 | 5/2005 | Cruz |
| 2005/0128853 A1 | 6/2005 | Ayukawa et al. |
| 2005/0138271 A1 | 6/2005 | Bernstein et al. |
| 2005/0182893 A1 | 8/2005 | Suh |
| 2005/0204091 A1 | 9/2005 | Kilbuck et al. |
| 2006/0004971 A1 | 1/2006 | Kim et al. |
| 2006/0031710 A1 | 2/2006 | Jo |
| 2006/0075284 A1 | 4/2006 | Skan et al. |
| 2006/0109725 A1 | 5/2006 | Yoon et al. |
| 2006/0184710 A1 | 8/2006 | Valdivia et al. |
| 2006/0239075 A1 | 10/2006 | Williams et al. |
| 2006/0291304 A1 | 12/2006 | Rothman et al. |
| 2006/0294295 A1 | 12/2006 | Fukuzo |
| 2007/0050536 A1 | 3/2007 | Kolokowsky |
| 2007/0288683 A1 | 12/2007 | Panabaker et al. |
| 2007/0300008 A1 | 12/2007 | Rogers et al. |
| 2008/0082736 A1 | 4/2008 | Chow et al. |
| 2009/0089343 A1* | 4/2009 | Moore ............... G06F 3/0608 |
| 2009/0100215 A1 | 4/2009 | Nochimowski |
| 2009/0106484 A1 | 4/2009 | Yeh et al. |
| 2009/0249052 A1 | 10/2009 | Sareen |
| 2010/0082879 A1 | 4/2010 | Mckean |
| 2010/0138677 A1 | 6/2010 | Pagan et al. |
| 2010/0217924 A1 | 8/2010 | Panabaker et al. |
| 2010/0262633 A1 | 10/2010 | Bhattacharjee et al. |
| 2010/0268866 A1 | 10/2010 | Colligan |
| 2010/0268874 A1 | 10/2010 | Pyeon |
| 2010/0306484 A1 | 12/2010 | Obr et al. |
| 2011/0138106 A1 | 6/2011 | Prabhakaran et al. |
| 2011/0219187 A1* | 9/2011 | Gara ................... G06F 12/08 711/118 |
| 2012/0047323 A1 | 2/2012 | Sareen |
| 2012/0054248 A1 | 3/2012 | Mehrotra et al. |
| 2012/0233386 A1 | 9/2012 | Tong et al. |
| 2012/0239859 A1 | 9/2012 | Lary et al. |
| 2012/0284544 A1 | 11/2012 | Xian et al. |
| 2012/0290774 A1 | 11/2012 | Trika |
| 2012/0317337 A1 | 12/2012 | Johar et al. |
| 2013/0204841 A1 | 8/2013 | Obusek |
| 2013/0285911 A1* | 10/2013 | Nissen ................ G06F 1/3206 345/163 |
| 2014/0122809 A1 | 5/2014 | Robertson et al. |
| 2014/0164675 A1 | 6/2014 | Ehrlich et al. |
| 2014/0317317 A1 | 10/2014 | Iyigun et al. |
| 2014/0325169 A1 | 10/2014 | Iyigun et al. |
| 2016/0202912 A1 | 7/2016 | Iyigun et al. |

FOREIGN PATENT DOCUMENTS

| | | |
|---|---|---|
| CN | 1797339 | 7/2006 |
| CN | 1967504 | 5/2007 |
| CN | 101473438 | 7/2009 |
| CN | 102388358 | 3/2012 |
| EP | 0566306 | 10/1993 |
| EP | 1890236 | 2/2008 |
| GB | 2291991 | 2/1996 |
| JP | 2001142774 | 5/2001 |
| JP | 2001338468 | 12/2001 |
| JP | 2001344967 | 12/2001 |
| JP | 2003036204 | 2/2003 |
| JP | 2003091463 | 3/2003 |
| JP | 2009540431 | 11/2009 |
| JP | 2011181098 | 9/2011 |
| JP | 5613103 | 9/2014 |
| KR | 20090026276 | 3/2009 |
| KR | 101159400 | 6/2012 |
| MX | 2008014859 | 12/2008 |
| RU | 2008148129 | 6/2010 |
| TW | 484064 | 4/2002 |
| TW | I244092 | 1/2005 |
| TW | 200745848 | 12/2007 |
| WO | WO-97/37296 | 10/1997 |
| WO | WO-2005062309 | 7/2005 |
| WO | WO-2006060670 | 6/2006 |
| WO | WO-2007146845 | 12/2007 |
| WO | WO-2008131058 | 10/2008 |
| WO | WO-2009120423 | 10/2009 |
| WO | WO-2013055312 | 4/2013 |

OTHER PUBLICATIONS

"Foreign Notice of Allowance", Mexican Application No. PA/a/2012/002259, (Jun. 28, 2013), 4 pages.

"Foreign Notice of Allowance", TW Application No. 96113112, (Sep. 3, 2013), 4 pages.

"Foreign Office Action", JP Application No. 2011-111408, (Aug. 27, 2013), 4 pages.

"International Search Report and Written Opinion", Application No. PCT/US2013/058840, (Oct. 31, 2013), 8 pages.

"Foreign Office Action", JP Application No. 2011-111408, Apr. 2, 2014, 4 Pages.

"Notice of Allowance", U.S. Appl. No. 13/830,445, Mar. 26, 2014, 7 pages.

"International Search Report and Written Opinion", Application No. PCT/US2014/020954, May 22, 2014, 8 pages.

"Foreign Notice of Allowance", CN Application No. 200980111459.6, Mar. 27, 2013, 6 pages.

"Foreign Notice of Allowance", JP Application No. 2011-111408, Aug. 7, 2014, 4 Pages.

"Non-Final Office Action", U.S. Appl. No. 10/087,251, Jun. 3, 2005, 14 pages.

"Non-Final Office Action", U.S. Appl. No. 10/372,734, Sep. 1, 2005, 8 Pages.

"Notice of Allowance", U.S. Appl. No. 10/087,251, Apr. 24, 2006, 6 Pages.

"Notice of Allowance", U.S. Appl. No. 10/087,251, Nov. 14, 2005, 6 Pages.

"Notice of Allowance", U.S. Appl. No. 10/372,734, Mar. 14, 2006, 6 Pages.

"Notice of Allowance", U.S. Appl. No. 14/320,232, Aug. 15, 2014, 6 pages.

"Bitmap Index", Wikipedia, the free encyclopedia, Oct. 3, 2012, Retrieved from the Internet Sep. 25, 2014: URL:http://en.wikipedia.org/w/index.php?title= Bitmap index&oldid=515775572,Oct. 3, 2012, 7 Pages.

"Run-length encoding", Wikipedia, the free encyclopedia, Feb. 28, 2013, Retrieved from the Internet on Sep. 25, 2014 URL:http://en.wikipedia.org/w/index.php?title=Run-length_encoding &oldid=541291392,Feb. 28, 2013, 3 Pages.

"Written Opinion", PCT Application No. PCTUS2014020954, Oct. 6, 2014, 6 Pages.

"Foreign Office Action", TW Application No. 98104862, Jan. 6, 2015, 12 pages.

"Notice of Allowance", U.S. Appl. No. 14/320,232, Dec. 9, 2014, 6 pages.

"Final Office Action", U.S. Appl. No. 11/449,435, (Dec. 4, 2008),6 Pages.

"Final Office Action", U.S. Appl. No. 12/055,315, (Jun. 24, 2011), 6 pages.

"Final Office Action", U.S. Appl. No. 13/287,344, (Nov. 7, 2012),10 pages.

"Final Rejection", JP Application No. 2009-514323, (Jan. 14, 2011), 4 pages.

"Foreign Notice of Allowance", CN Application No. 200780021218.3, (Jan. 20, 2012), 4 pages.

"Foreign Notice of Allowance", RU Application No. 2008148129, (Aug. 11, 2011), 24 pages.

"Foreign Office Action", Chinese Application No. 200980111459.6, (Oct. 10, 2012), 9 pages.

"Foreign Office Action", CN Application No. 200780021218.3, (Jan. 29, 2010), 9 pages.

"Foreign Office Action", CN Application No. 200780021218.3, (May 3, 2011), 8 pages.

"Foreign Office Action", EP Application No. 07795704.1, (Apr. 15, 2011), 4 pages.

(56) References Cited

OTHER PUBLICATIONS

"Foreign Office Action", JP Application No. 2009-514323, (May 14, 2010),13 pages.
"Foreign Office Action", JP Application No. 2011-111408, (Dec. 18, 2012), 8 pages.
"Foreign Office Action", RU Application No. 2008148129, (May 18, 2011), 7 pages.
"International Search Report", PCT/US2009/034199, (Oct. 1, 2009),3 pages.
"Micron Technology Announces Syncflash TM Memory, A New Flash Memory Technology.", retrieved from <http://www.micron.com/news/product/1999-11-16197.htms?print_yes, (Nov. 22, 1999), 2 pages.
"Non Final Office Action", U.S. Appl. No. 10/186,164, (Jun. 7, 2005), 5 Pages.
"Non Final Office Action", U.S. Appl. No. 10/301,800, (Jun. 13, 2005),12 Pages.
"Non Final Office Action", U.S. Appl. No. 11/204,573, (Dec. 20, 2005), 8 Pages.
"Non Final Office Action", U.S. Appl. No. 11/204,684, (Aug. 18, 2006), 9 Pages.
"Non Final Office Action", U.S. Appl. No. 11/204,705, (Feb. 17, 2006),16 Pages.
"Non Final Office Action", U.S. Appl. No. 11/267,097, (Mar. 22, 2006), 7 Pages.
"Non Final Office Action", U.S. Appl. No. 11/267,362, (Mar. 22, 2006), 6 Pages.
"Non Final Office Action", U.S. Appl. No. 11/449,435, (Jan. 28, 2008), 8 Pages.
"Non Final Office Action", U.S. Appl. No. 11/449,435, (May 26, 2009), 8 Pages.
"Non Final Office Action", U.S. Appl. No. 12/055,315, (Mar. 7, 2011), 9 pages.
"Non-Final Office Action", U.S. Appl. No. 13/287,344, (Apr. 27, 2012),11 pages.
"Notice of Allowance", U.S. Appl. No. 10/186,164, (Oct. 4, 2005),11 Pages.
"Notice of Allowance", U.S. Appl. No. 10/301,800, (Sep. 6, 2005),11 Pages.
"Notice of Allowance", U.S. Appl. No. 11/204,573, (May 12, 2006), 7 Pages.
"Notice of Allowance", U.S. Appl. No. 11/204,684, (Nov. 27, 2006), 4 pages.
"Notice of Allowance", U.S. Appl. No. 11/204,705, (Jun. 22, 2006), 6 Pages.
"Notice of Allowance", U.S. Appl. No. 11/267,097, (Apr. 24, 2006), 5 Pages.
"Notice of Allowance", U.S. Appl. No. 11/267,362, (Apr. 24, 2006), 6 Pages.
"Notice of Allowance", U.S. Appl. No. 11/449,435, (Jan. 26, 2010), 7 Pages.
"Notice of Allowance", U.S. Appl. No. 12/055,315, (Aug. 16, 2011), 8 pages.
"Notice of Allowance", U.S. Appl. No. 12/771,670, (Jan. 7, 2013), 8 Pages.
"Notice of Allowance", U.S. Appl. No. 13/287,344, (Jan. 30, 2013), 7 pages.
"SSD Performance, HDD Capacity, Affordable Price", Retrieved from <http://www.seagate.com/internal-hard-drives/laptop-hard-drives/momentus-xt-hybrid/> on Feb. 5, 2013, (Nov. 2012), 2 pages.
"Supplementary European Search Report", EP Application No. 07795704.1, (Jun. 30, 2010), 9 pages.
"WD® Creates World's Thinnest 2.5-inch Hybrid Hard Drive", Retrieved from <http://www.prnewswire.com/news-releases/wd-creates-worlds-thinnest-2-5-inch-hybrid-hard-drive-169157916.html> on Feb. 5, 2013, (Sep. 10, 2012), 2 pages.
"Wear Leveling", Available at <http://www.storagereview.com/guide/featuresLeveling.html>, (May 16, 2007), 2 pages.
"Written Opinion", PCT/US2009/034199, (Oct. 1, 2009), 3 pages.
Baggett, Ivan "DOS Stamp Users Manual", Retrieved from http://www.bagotronix.com/stmpman.pdf on Aug 11, 2009, (Feb. 16, 2001),p. 19.
Jex, Jerry "Flash Memory Bios for PC and Notebook Computers", *Communications, Computers and Signal Processing*, 1991., IEEE Pacific Rim Conference, (May 9, 1991), p. 692-695.
Pnevmatikatos, et al., "On Using Network RAM as a non-volatile Buffer", Retrieved from http://dcs.ics.forth.gr/Activities/papers/TR.pdf, (Aug. 1998),14 pages.
Rosenblum, Mendel et al., "The Design and Implementation of a Log-Structured File System", *Electrical Engineering and Computer Sciences, Computer Science Division, University of California, Berkeley, CA*, (1991),15 pages.
Sandisk, "DiskOnChip 2000 DIP from 16MByte to 1GByte", *Data Sheet*, (Mar. 2006), pp. 1-29.
"International Search Report and Written Opinion", Application No. PCT/US2013/058841, Feb. 11, 2016, 12 Pages.
Joo, et al., "Fast: Quick Application Launch on Solid-State Drives", Retrieved at <<http://static.usenix.org/event/fast11/tech/full_papers/Joo.pdf>>, In Proceedings of the 9th USENIX Conference on File and Storage Technologies, Feb. 15, 2011, pp. 14.
Saxena, et al., "FlashTier: A Lightweight, Consistent and Durable Storage Cache", Retrieved at <<http://pages.cs.wisc.edu/~swift/papers/eurosys12_flashtier.pdf, In Proceedings of EuroSys'12, Apr. 10, 2012, pp. 14.
Li, et al., "An Efficient SSD-based Hybrid Storage Architecture for Large-Scale Search Engines", Retrieved at <<http://idc.hust.edu.cn/~rxli/publications/2012/ICPP12_SSD-IR-Cache.pdf>>, In Proceedings of 41st International Conference on Parallel Processing (ICPP), Sep. 10, 2012, pp. 10.
Chen, et al, "Hystor: Making the Best Use of Solid State Drives in High Performance Storage Systems", Retrieved at <<http://www.cse.ohio-state.edu/~fchen/paper/papers/ics11.pdf>>, In Proceedings of the 25th International Conference on Supercomputing, May 31, 2011, pp. 11.
"Foreign Office Action", EP Application No. 07795704.1, Jul. 5, 2016, 5 pages.
"Foreign Office Action", TW Application No. 104111138, May 16, 2016, 15 pages.
"Non-Final Office Action", U.S. Appl. No. 13/870,670, Jun. 15, 2016, 23 pages.
"Non-Final Office Action", U.S. Appl. No. 15/076,228, Jun. 30, 2016, 10 pages.
"Notice of Allowance", U.S. Appl. No. 14/664,411, Jun. 4, 2015, 8 pages.
"Notice of Allowance", U.S. Appl. No. 14/664,411, Nov. 18, 2015, 8 pages.
"Second Written Opinion", U.S. Appl. No. PCT/US2013/058841, Jun. 17, 2016, 5 pages.
"International Preliminary Report on Patentability", U.S. Appl. No. PCT/US2013/058841, Aug. 26, 2016, 6 pages.
"Foreign Notice of Allowance", TW Application No. 104111138, Dec. 27, 2016, 4 pages.
"Final Office Action", U.S. Appl. No. 13/870,670, Nov. 28, 2016, 8 pages.

\* cited by examiner

600

602

Assign One Of Multiple Priority Levels To Groups Of Data Accessed By Issuing One Or More I/O Commands To The Hybrid Drive While The Computing Device Is Operating In The Power Saving Mode

604

Communicate Indications Of The Priority Levels With I/O Commands Issued To The Hybrid Drive

Fig. 6

POWER SAVING MODE HYBRID DRIVE ACCESS MANAGEMENT

BACKGROUND

Computers have traditionally had storage devices on which data such as program instructions and user data can be stored. As technology has advanced, these storage devices have included magnetic floppy disks, magnetic hard disks, solid state drives (e.g., flash memory drives), and so forth. Some hybrid drives have also been developed that include both a larger capacity (but less expensive) hard drive and a smaller capacity (but more expensive) flash memory drive. Although such hybrid drives can be beneficial they are not without their problems. One such problem is that it remains difficult to determine which data is to be stored on the flash memory drive of the hybrid drive. A poor determination as to which data to store on the flash memory drive can lead to little if any performance improvement of the hybrid drive over a traditional magnetic media hard drive, resulting in user frustration due to the lack of performance improvement despite the higher cost of the hybrid drive.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, one of multiple priority levels are assigned to groups of data accessed by issuing one or more input/output (I/O) commands to a hybrid drive while the computing device is operating in a power saving mode. The hybrid drive includes both a performance part and a base part in which groups of data can be stored, and the one of the multiple priority levels is a priority level that is at least a lowest priority level of the multiple priority levels to reduce accesses to the base part while the computing device is in the power saving mode. An indication of the assigned priority level of the groups of data accessed while the computing device is in the power saving mode is communicated to the hybrid drive by issuing one or more I/O commands to the hybrid drive.

In accordance with one or more aspects, a determination that a computing device is operating in a power saving mode is made, the computing device accessing a hybrid drive that includes both a performance part and a base part in which groups of data can be stored. A record identifying groups of data accessed by issuing one or more input/output (I/O) commands to the hybrid drive while the computing device is operating in the power saving mode is maintained. The groups of data accessed while the computing device is operating in the power saving mode are assigned one of multiple priority levels that is a priority level that is at least a lowest priority level of the multiple priority levels to reduce accesses to the base part while the computing device is in the power saving mode.

BRIEF DESCRIPTION OF THE DRAWINGS

The same numbers are used throughout the drawings to reference like features.

FIG. 6 is a flowchart illustrating an example process for power saving mode hybrid drive access management in accordance with one or more embodiments.

DETAILED DESCRIPTION

Power saving mode hybrid drive access management is discussed herein. A hybrid drive includes multiple parts: a performance part (e.g., a flash memory device) and a base part (e.g., a hard disk drive). A drive access system, which is typically part of an operating system of a computing device, issues input/output (I/O) commands to the hybrid drive to store data to and retrieve data from the hybrid drive. The drive access system supports multiple priority levels and obtains priority levels for groups of data identified by logical block addresses (LBAs). With each I/O command, the drive access system can include an indication of the priority level of the LBA(s) associated with the I/O command. The hybrid drive determines, based at least in part on the priority level indications received from the drive access system, which LBAs are to be stored on which part or parts of the hybrid drive.

A record of LBAs accessed while a device implementing the drive access system is operating in a power saving mode is maintained. The LBAs accessed (e.g., read) while the device is operating in a power saving mode can be assigned a higher priority level than the lowest of the multiple priority levels supported by the device. By assigning the LBAs accessed (e.g., read) while the device is operating in a power saving mode a higher priority level, data accessed while the device is operating in the power saving mode is more likely to be stored in the performance part of the hybrid drive and accesses to the base part of the hybrid drive can be reduced while the device is operating in the power saving mode.

Figure 1:
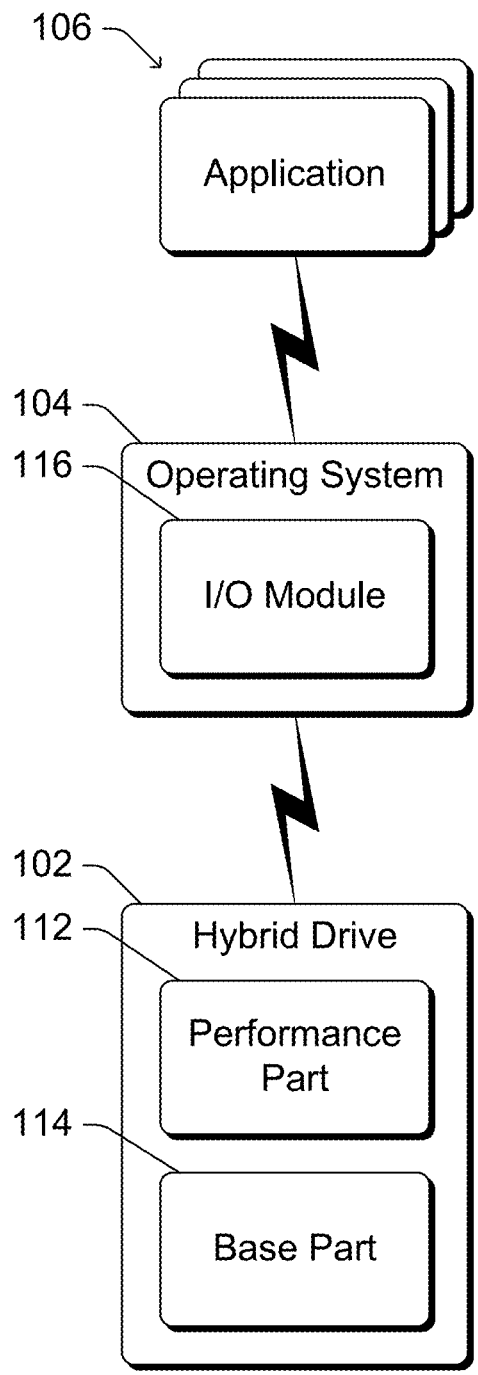
FIG. 1 illustrates an example system implementing the power saving mode hybrid drive access management in accordance with one or more embodiments.

FIG. 1 illustrates an example system 100 implementing the power saving mode hybrid drive access management in accordance with one or more embodiments. System 100 includes a hybrid drive 102, an operating system 104, and one or more applications 106. Hybrid drive 102 can be implemented in different manners, such as a fixed drive in a computing device, a removable device coupled to a computing device (e.g., via a Universal Serial Bus (USB) connection), and so forth.

In one or more embodiments, system 100 is implemented on a single computing device. System 100 can be implemented on a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, system 100 can be implemented on computing devices ranging from full resource devices with substantial memory and processor resources (e.g., personal computers, game consoles) to low-resource devices with limited memory and/or processing resources (e.g., traditional set-top boxes, hand-held game consoles).

Alternatively, system 100 can be implemented on multiple different devices. For example, operating system 104 and applications 106 can be implemented on one device (e.g., any of a variety of different types of computing devices as discussed above) and hybrid drive 102 can be implemented as a separate device. When implemented separately, the device implementing operating system 104 can communicate with hybrid drive 102 in different manners, such as via a wired and/or wireless connection (e.g., via a USB connection, a wireless USB connection, etc.), via a network (e.g., via a local area network (LAN), a personal area network (PAN), etc.), and so forth.

Hybrid drive 102 includes two parts: a performance part 112 and a base part 114. Performance part 112 is a higher performance part than base part 114. The performance of parts 112 and 114 can refer to various different characteristics of the parts 112 and 114, such as the speed of the parts (e.g., the rate at which information can be read from and/or written to the parts) and/or the power consumption of the parts (e.g., the amount of power consumed by the parts when active and able to be read from and/or written to). Performance part 112 is faster and/or has less power consumption than base part 114, and thus is referred to as a higher performance part than base part 114. However, performance part 112 typically costs more per unit of storage (e.g., per gigabyte) than base part 114. Thus, base part 114 typically has more storage capacity than performance part 112, also referred to as base part 114 being larger than performance part 112 or the size of base part 114 being larger than the size of performance part 112.

Performance part 112 and base part 114 can be implemented in different manners. In one or more embodiments, performance part 112 is a solid state device (e.g., a flash memory device) and base part 114 is a rotational storage device (e.g., a magnetic hard disk drive). Alternatively, parts 112 and 114 can be implemented in other manners. For example, performance part 112 can be one type of solid state device (e.g., single-level cell (SLC) flash memory) and base part 114 can be another type of solid state device (e.g., multi-level cell (MLC) flash memory). By way of another example, one or both of parts 112 and 114 can be implemented using various other types of storage devices and technology, such as memristor memory technology, phase change memory technology, and so forth.

Although hybrid drive 102 includes multiple parts, hybrid drive 102 operates as a single storage drive from the perspective of operating system 104. The size (storage capacity) of hybrid drive 102 is the size of the larger of performance parts 112 and base part 114, which is typically base part 114 due to the lower cost per unit of storage of base part 114. Hybrid drive 102 is presented to operating system 104 as a single storage device—operating system 104 reads data from and writes data to hybrid drive 102 as if drive 102 were a single storage device. However, operating system 104 is aware that hybrid drive 102 includes multiple parts, and thus operating system 104 provides indications or hints to hybrid drive 102 as to the importance of various data to assist hybrid drive 102 in determining which part to store data in, as discussed in more detail below. Hybrid drive 102 can be presented to operating system 104 as a single storage device in various manners. For example, hybrid drive 102 can present itself to operating system 104 as a single storage device, hybrid drive 102 can be disparate devices that a hardware controller presents to operating system 104 as a single storage device, hybrid drive 102 can be multiple devices that a software driver running on the operating system 104 presents to operating system 104 as a single storage device, and so forth.

Operating system 104 includes an I/O module 116 that issues I/O commands to access hybrid drive 102, including commands to read data from hybrid drive 102 and commands to write data to hybrid drive 102. The commands to read and write data can be from other modules of operating system 104 as well as applications 106. As used herein, the data being read from and written to hybrid drive 102 includes any bits that are read from and/or written to hybrid drive 102—the data can include user data or program data, program instructions, binary code, and so forth.

Operating system 104 assigns priority levels to groups of logical block addresses (LBAs). An LBA is an address of a location on hybrid drive 102 where data is stored, and the data stored at that location is also referred to as the LBA data. The amount of data stored at a particular LBA can vary based on the manner in which hybrid drive 102 is implemented. The priority level assigned to a particular LBA is also referred to as being assigned to the data stored at that particular LBA. Because the priority levels are assigned to groups of LBAs, the priority levels can also be referred to as being assigned to groups of data (that are identified by the LBAs).

Operating system 104 assigns priorities to LBAs at a granularity of groups of multiple LBAs (although operating system 104 could alternatively assign priorities at a granularity of the LBAs). Using a granularity of groups of multiple LBAs, the size of a group of LBAs can vary, such as being a collection of LBAs at which 16 kilobytes of data is stored or a collection of LBAs at which 64 kilobytes of data is stored. In one or more embodiments, each group of LBAs is a contiguous range of addresses. Alternatively, a group can include LBAs in other manners in which case LBAs in a group may not be a contiguous range of addresses. Priority levels for groups of LBAs can be assigned based on various information, such as information regarding the frequency with which LBAs in the group are accessed, information regarding events occurring during or preceding access to an LBA, and so forth. An LBA is assigned the priority that is assigned to the group that includes the LBA, and all of the LBAs in the group are assigned the same priority.

For each I/O command issued to hybrid drive 102, I/O module 116 can include with the I/O command an indication of the priority level assigned to the LBA accessed by the I/O command. Although I/O module 116 can include an indication of the priority level assigned to the LBA accessed by the I/O command, I/O module 116 is not obligated to include the priority level and in some situations may not include a priority level.

The priority level assigned to an LBA can be maintained by hybrid drive 102 to facilitate management of LBAs in hybrid drive 102. The priority level is an indication of the perceived importance to operating system 104 of the data stored at the LBA (also referred to as the perceived importance of the LBA). Generally, the perceived importance of data refers to the speed at which access to the data is desired and/or the frequency with which the data is desired. Data to which fast access is desired (e.g., to improve the speed at which a computing device boots or launches an application) can be deemed to be of greater importance than data to which fast access is not as desirable. Furthermore, data that is accessed frequently can be deemed to be of greater importance than data that is accessed infrequently. Operating system 104 expects hybrid drive 102 to store data for LBAs (also referred to as storing the LBAs) in parts 112 and 114 based on their priority levels so that data at LBAs with higher priority levels are stored in performance part 112 (in addition to or rather than in base part 114). However, hybrid drive 102 is not bound or obligated to store data at LBAs of any particular priority level in performance part 112 and operating system 104 need not have, and typically does not have, knowledge of which of parts 112 and 114 data at a particular LBA is stored in. Which part data at a particular LBA is stored in is determined by hybrid drive 102 itself rather than operating system 104, although this determination is typically made by hybrid drive 102 based on the priority level indicated by I/O module 116.

It should be noted that although hybrid drive 102 determines which of parts 112 and 114 particular LBA data is stored in based on the indications from operating system 104, hybrid drive 102 can include an additional one or more modules to determine which of parts 112 and 114 particular LBA data is stored in. For example, hybrid drive 102 itself can monitor I/O accesses and determine based at least in part on this monitoring which of parts 112 and 114 particular LBA data is stored in. Operating system 104 need not, and typically does not, have knowledge of such additional modules or monitoring by hybrid drive 102, and continues to provide indications of priority levels to hybrid drive 102 as discussed herein regardless of any such additional modules or monitoring of hybrid drive 102.

It should also be noted that, although hybrid drive 102 is illustrated with two parts 112 and 114, each of these parts can be made up of multiple components. For example, performance part 112 may be made up of multiple flash memory chips or a single flash memory chip. By way of another example, base part 114 may be made up of a single hard disk drive or multiple hard disk drives. These different components can all be implemented in the same device (e.g., the same drive enclosure) or alternatively be spread across multiple devices (e.g., multiple different enclosures) coupled to one another (e.g., via a USB or wireless USB connection, or via a network).

Furthermore, it should be noted that although hybrid drive 102 is discussed herein as including two parts, hybrid drive 102 can alternatively include three or more parts. For example, hybrid drive 102 may include a middle performance part that is a higher performance part than base part 114 but a lower performance part than performance part 112. In such situations, the parts other than the base part 114 can also be referred to as performance parts. Regardless of the number of parts, indications of priority levels of LBAs are provided to hybrid drive 102 by operating system 104, and hybrid drive 102 determines which part or parts to store the LBAs on based on these priority level indications.

Figure 2:
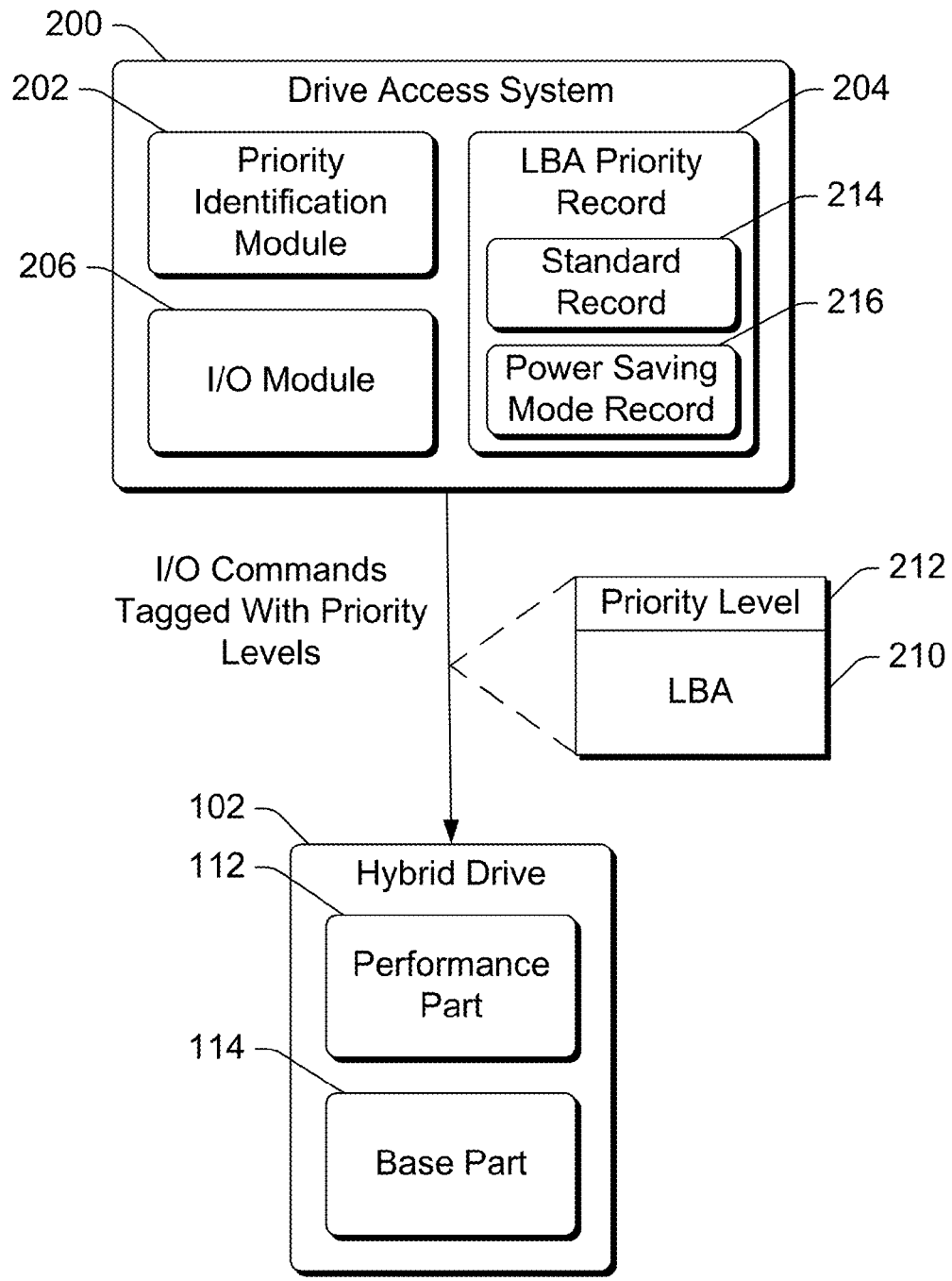
FIG. 2 illustrates an example drive access system in accordance with one or more embodiments.

FIG. 2 illustrates an example drive access system 200 in accordance with one or more embodiments. Drive access system 200 can be implemented as part of an operating system, such as operating system 104 of FIG. 1. Alternatively, drive access system 200 can be implemented as part of another program or application that accesses hybrid drive 102, such as a Web browser program, a data access or storage program, and so forth.

Drive access system 200 includes a priority identification module 202, an LBA priority record 204, and an I/O module 206. I/O module 206 and I/O module 116 of FIG. 1 can be the same module. Drive access system 200 can be implemented as part of a single device (e.g., as part of an operating system of a computing device) or across multiple devices. For example, LBA priority record 204 and I/O module 206 may be implemented by one computing device, and at least part of priority identification module 202 may be implemented by another device (e.g., a server coupled to the computing device via a network).

Generally, priority identification module 202 obtains priority levels assigned to particular LBAs. Priority identification module 202 can obtain the priority levels in different manners, such as determining priority levels for LBAs based on information regarding I/O accesses to hybrid drive 102, obtaining the priority levels for LBAs from a remote service or system, being pre-configured with priority levels for LBAs, combinations thereof, and so forth. As I/O module 206 issues I/O commands to hybrid drive 102, I/O module 206 provides to hybrid drive 102 indications of the priority levels assigned to particular LBAs associated with those I/O commands. For example, an LBA 210 assigned a priority level 212 is illustrated in FIG. 2. Additional data (e.g., to be written to hybrid drive 102) can also be sent to hybrid drive 102 along with LBA 210 and priority level 212.

Generally, data is assigned a particular priority level based on whether placing the data in performance part 112 is expected to increase the user-noticeable speed of the device (e.g., the speed at which a computing device boots or launches an application) and/or reduce the power consumption of the computing device. For example, data read when booting the computing device, resuming the computing device from hibernation, transferring or swapping pages of memory out of volatile memory to hybrid drive 102, launching an application on the computing device, and so forth can be assigned a higher priority level than other general usage data (e.g., data accessed by applications when running) to increase the user-noticeable speed of the device due to such data being more likely to be stored in performance part 112. Additionally, data can be assigned a particular priority level so that there is a sufficient amount of data (e.g., 1 gigabyte or 4 gigabytes of data) at a lowest priority level in performance part 112 so that LBA data assigned the lowest priority level can be removed from performance part 112 and stored in base part 114 as desired (thus keeping LBA data with a higher priority level in performance part 112).

Maintaining a sufficient amount of data at a lowest priority level in performance part 112 allows hybrid drive 102 to churn data at the lowest priority level in performance part 112 without adversely affecting data at higher priority levels in performance part 112. In situations where there is insufficient space in performance part 112 to store LBA data for all I/O accesses to hybrid drive 102, hybrid drive 102 transfers data from performance part 112 to base part 114 (which can include copying data from performance part 112 to base part 114 prior to deleting the data, or deleting data from performance part 112 that has already been copied to base part 114) starting with data at the lowest priority (and for data at that that lowest priority, according to some policy such as transferring the least recently used (LRU) data first). Keeping the amount of data at the lowest priority relatively large when compared to data at higher priorities ensures that as space in performance part 112 becomes scarce, there is low priority data to transfer to base part 114 first, and therefore higher priority data is less likely to be transferred. Additionally, by keeping the amount of data at the lowest priority relatively large, data added to performance part 112 at the lowest priority is permitted to remain in performance part 112 for a reasonably long amount of time even though performance part 112 may be relatively full. E.g., by implementing an LRU policy in determining which data is transferred out of performance part 112 first, there is a sufficient amount of data (e.g., 1 gigabyte of data, 4 gigabytes of data, etc.) that would be transferred out of performance part 112 before the newly added data is transferred out of performance part 112.

Multiple different priority levels can be supported by drive access system 200, and the priority levels can be labeled in different manners. In one or more embodiments there are four priority levels, labeled as: Priority Level 4, Priority Level 3, Priority Level 2, and Priority Level 1. However, there can alternatively be any number of priority levels. The priority levels can also be labeled in different manners, such as using letters, different characters or symbols, and so forth. In addition to the priority levels, drive access system 200 may support no priority level for some LBAs. LBA data assigned no priority level is stored in base part 114 rather than performance part 112—no determination need be made by hybrid drive 102 as to which part the LBA data is stored in. It should also be noted that in one or more embodiments hybrid drive 102 can implement one or more additional hidden or private priority levels. These additional hidden or private priority levels are not used by and are not visible to drive access system 200, but can be used by hybrid drive 102 to manage where LBA data is stored according to internal policy of hybrid drive 102.

LBA priority record 204 is an identification of the priority levels assigned to particular LBAs. Generally, LBA priority record 204 indicates, for a given LBA, the priority level to which the LBA is assigned. In some situations, however, a particular LBA may be assigned to no priority level, in which case no identification of an assigned priority level may be included in LBA priority record 204 for the LBA.

Priority identification module 202 obtains the priority levels for LBAs and generates (or updates) LBA priority record 204 as appropriate at various times. In one or more embodiments, module 202 obtains the priority levels and generates or updates record 204 at regular or irregular intervals, such as approximately daily, approximately weekly, an amount of time after some event (e.g., approximately 24 hours after being powered on or resumed from a hibernation mode), and so forth. Thus, it should be noted that the priority levels assigned to various LBAs can change over time. Module 202 can also determine the priority levels (and optionally update record 204) in response to an I/O access to be made to an LBA by I/O module 206 for which no priority level corresponding to the LBA has been set or while the device implementing drive access system is operating in a power saving mode as discussed below, also referred to as determining the priority level at runtime.

The device implementing drive access system 200 can operate in multiple different power modes. Priority identification module 202 can determine a current power mode of the device in a variety of different manners, such as by accessing a storage area where the current power mode of the device is recorded, receiving a notification of the current power mode of the device from an operating system of the device, and so forth. Priority identification module 202 classifies one or more power modes of the device as power saving modes. Which power modes are classified as power saving modes can be determined in various manners, such as based on particular pre-defined power modes (e.g., the device may have a set of multiple pre-defined power modes and module 202 is pre-configured with an indication of which one or more of those multiple pre-defined power modes are power saving modes), based on information obtained from other services or systems, based on particular device settings (e.g., screen brightness, power mode of a processor of the device, etc.), and so forth.

In one or more embodiments, one of the power saving modes in which the device can operate is referred to as a connected standby mode. In connected standby mode, some hardware components of the device (e.g., a processor) are powered on but operate in a low power mode, and other hardware components of the device (e.g., a display) are powered off. In connected standby mode network connections can be kept active or alternatively are re-established at regular or irregular intervals. Thus, in connected standby mode the device is operating in a low power mode, but allows regular or irregular network access to support various communications or notifications (e.g., update email or other messages).

LBAs accessed while the device is operating in a power saving mode can be assigned a priority level higher than the lowest priority level supported by drive access system 200 (or alternatively can be assigned the lowest priority level supported by drive access system 200). This assignment can be performed by various modules, such as priority identification module 202 or I/O module 206. By assigning LBAs accessed while the device is operating in a power saving mode a priority level higher than the lowest priority level supported by system 200, the likelihood of the data for the LBAs residing in performance part 112 the next time the LBAs are accessed in a power saving mode is increased, thus reducing accesses to base part 114 while the device is operating in the power saving mode and avoiding any increased power consumption in obtaining the data for the LBAs from base part 114 while the device is operating in the power saving mode.

For example, if system 200 supports Priority levels 4, 3, 2, 1, and 0, with priority level 0 being the lowest priority level and priority level 4 being the highest priority level, module 202 can assign LBAs accessed while the device is operating in a power saving mode priority level 2. Module 202 can optionally assign different priority levels to LBAs that are read from than LBAs that are written to while the device is operating in the power saving mode. E.g., continuing with the previous example, module 202 can assign LBAs read from while the device is operating in a power saving mode priority level 2, and assign LBAs written to while the device is operating in a power saving mode priority level 0.

LBA priority record 204 includes a standard record 214 and a power saving mode record 216. Power saving mode record 204 identifies LBAs read from (and optionally LBAs written to) while the device implementing system 200 is operating in a power saving mode. This identification can be, for example, an assignment of a particular priority level to LBAs read from (and optionally LBAs written to) while the device implementing system 200 is operating in a power saving mode. Standard record 214 identifies priority levels assigned to LBAs based on criteria other than the device operating in a power saving mode. Each of standard record 214 and power saving mode record 216 can be populated with priority levels for LBAs by priority identification module 202 or alternatively other devices or modules.

Figure 3:
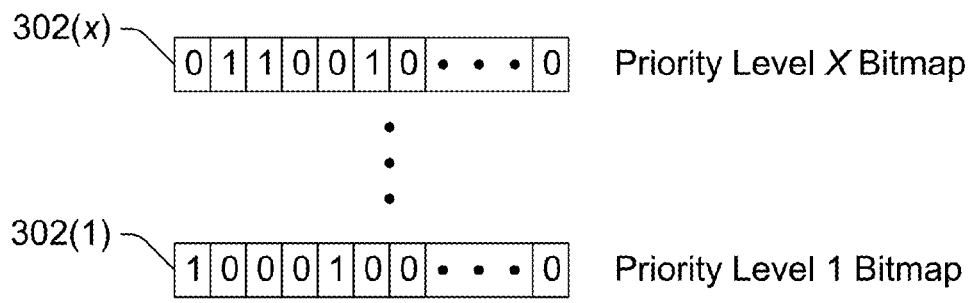
FIG. 3 illustrates an example set of bitmaps of a standard record of a logical block address (LBA) priority record in accordance with one or more embodiments.

In one or more embodiments, standard record 214 is a set of one or more bitmaps. FIG. 3 illustrates an example set of bitmaps 300 of a standard record of an LBA priority record in accordance with one or more embodiments. The set of bitmaps 300 include multiple (x) bitmaps 302(1), ..., 302(x), each corresponding to one of multiple priority levels illustrated as Priority Level 1, ..., Priority Level X. In one or more embodiments, each bitmap has multiple cells that store a bit, each cell corresponding to a particular range of LBAs (a group of LBAs, such as a group of LBAs at which 16 kilobytes of data or 64 kilobytes of data is stored, as discussed above). One value in the cell (e.g., a value of 0) indicates that the LBAs corresponding to the cell do not have the priority level corresponding to the bitmap, and another value in the cell (e.g., a value of 1) indicates that the LBAs corresponding to the cell do have the priority level corresponding to the bitmap. For example, looking at the leftmost cell of each bitmap 302, the LBAs corresponding to the leftmost cell have Priority Level 1 (due to the bit in the cell having a value of 1 in bitmap 302(1) and a value of 0 in bitmap 302(x)).

Standard record 214 of FIG. 2 can also be implemented using sparse bitmaps in order to reduce the amount of storage space used to maintain record 214. Sparse bitmaps refer to multi-level or multi-layer maps, each cell of a map in one layer representing multiple cells of a lower layer. Sparse bitmaps can be implemented in a variety of different manners.

Figure 4:
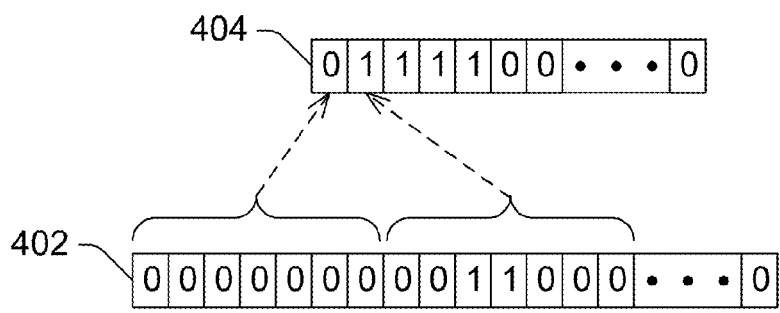
FIG. 4 illustrates an example of a sparse bitmap of an LBA priority record in accordance with one or more embodiments.

FIG. 4 illustrates an example of a sparse bitmap 400 of an LBA priority record in accordance with one or more embodiments. Sparse bitmap 400 includes two layers with a lower layer bitmap 402 and an upper layer map 404. Lower layer bitmap 402 includes multiple cells each corresponding to an LBA. Lower layer bitmap 402 can be, for example, a bitmap 302 of FIG. 3. The cells in bitmap 402 and map 404 are illustrated as being assigned a value of 0 to indicate that the LBAs corresponding to the cells do not have the priority level corresponding to the bitmap 402, and assigned a value of 1 to indicate that the LBAs corresponding to the cells do have the priority level corresponding to the bitmap 402. However, it should be noted that other values can alternatively be used (e.g., a value of 1 to indicate that the LBAs corresponding to the cells do not have the priority level corresponding to the bitmap 402, and a value of 0 to indicate that the LBAs corresponding to the cells do have the priority level corresponding to the bitmap 402).

Upper layer bitmap 404 includes multiple cells, each representing multiple cells in lower layer bitmap 402. If all of the cells in bitmap 402 that are represented by a particular cell in map 404 have a value of 0, then that particular cell in map 404 is also assigned a value of 0. If at least one of the cells in bitmap 402 that are represented by a particular cell in map 404 has a value of 1, then that particular cell in map 404 is also assigned a value of 1. Thus, to determine whether a particular LBA corresponds to the priority level corresponding to bitmap 402, a check can be made of the values of the cells in map 404, and for a particular cell in map 404 having a value of 0 it is readily known that none of the LBAs corresponding to the cells in bitmap 402 represented by that particular cell in bitmap 404 have the priority level corresponding to the bitmap 402.

Using sparse bitmaps, the sets of bitmaps can be stored and accessed with less memory requirements. For example, upper layer map 404 can be copied into random access memory of a computing device, but only the portions of bitmap 402 that are represented by a value of 1 are copied into random access memory. Furthermore, access to portions (e.g., groups of cells) of the sparse bitmaps can be monitored (e.g., by drive access system 200 of FIG. 2) and infrequently accessed portions (e.g., portions accessed less than a threshold amount of time) can be compressed. This compression conserves storage space (e.g., random access memory), and compressed portions can be decompressed if accessed.

The size of bitmap 402 and map 404 can vary, based at least in part on the amount of data (e.g., number of bytes) each bit in a bitmap represents and on the amount of storage space in the base part of the hybrid drive. For example, if the base part of the hybrid drive has 1 terabyte of storage space and each bit in lower layer bitmap 402 represents 16 kilobytes, then lower layer bitmap 402 would be 8 megabytes. Lower layer bitmap 402 can be broken into 4 kilobyte bitmaps, each representing 512 megabytes of the base part of the hybrid drive. Upper layer map 404 would thus be 2 kilobits.

Although upper layer map 404 is discussed above as being a bitmap in which each cell is assigned a value of 0 or 1, it should be noted that upper layer map 404 can be implemented in other manners. For example, rather than a value of 0 or 1, each cell in upper layer map 404 may include a pointer to lower layer bitmap 402 (e.g., a pointer to one of the cells in lower layer bitmap 402 that are represented by the cell of upper layer map 404). Various additional information may also be maintained, such as a lock value associated with each cell of upper layer map 404 to maintain synchronization when accessing upper layer map 404 and/or lower layer bitmap 402.

Although two layers are illustrated in FIG. 4, it should be noted that a sparse bitmap can include any number of layers, with each cell in the bitmap at the lowest layer corresponding to an LBA, and each cell in the bitmap at a higher layer representing multiple cells of a lower layer.

Figure 5:
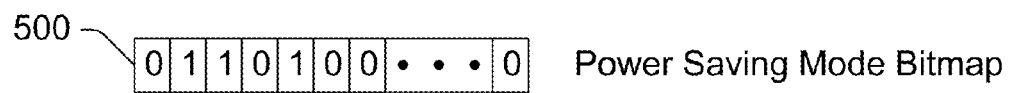
FIG. 5 illustrates an example bitmap of a power saving mode record of an LBA priority record in accordance with one or more embodiments.

In one or more embodiments, power saving mode record 216 of FIG. 2 is also a set of one or more bitmaps. FIG. 5 illustrates an example bitmap 500 of a power saving mode record of an LBA priority record in accordance with one or more embodiments. In one or more embodiments, bitmap 500 has multiple cells that store a bit, each cell corresponding to a particular range of LBAs (a group of LBAs, such as a group of LBAs at which 16 kilobytes of data or 64 kilobytes of data is stored, as discussed above), analogous to bitmaps 302 of FIG. 3. One value in the cell (e.g., a value of 1) indicates that the LBAs corresponding to the cell were accessed (e.g., read from) while the device implementing drive access system 200 of FIG. 2 was operating in a power saving mode, and another value in the cell (e.g., a value of 0) indicates that the LBAs corresponding to the cell were not accessed (e.g., read from) while the device implementing drive access system 200 was operating in a power saving mode. For example, looking at the leftmost cell of bitmap 500, the LBAs corresponding to the leftmost cell were not accessed (e.g., read from) while the device implementing drive access system 200 was operating in a power saving mode (due to the bit in the cell having a value of 0 in bitmap 500).

Power saving mode record 216 can also be implemented using sparse bitmaps in order to reduce the amount of storage space used to maintain record 216. Sparse bitmaps can be implemented in a variety of different manners as discussed above. For example, bitmap 500 can be lower layer bitmap 402 of FIG. 4.

In one or more embodiments, bitmap 500 of FIG. 5 is logically OR'd or otherwise combined with the bitmap 302 of FIG. 3 of the corresponding priority level. This corresponding priority level refers to the priority level at which reads or other accesses to hybrid drive 102 are made while the device is in a power saving mode. For example, if LBAs that are read from while the device is operating in the power saving mode are assigned priority level 2, then bitmap 500 is logically OR'd with priority level 2 bitmap 302. When logically OR'ing two bitmaps, for each corresponding cell of the bitmap, if one or both of the cells in the two bitmaps have a particular value (e.g., 1) then the result is a value of 1, and if both of the cells in the two bitmaps have another value (e.g., 0) then the result is a value of 0. For example, if the value of the leftmost cell of the bitmap 302 were a "0" and the value of the leftmost cell of bitmap 500 were a "1", then the result would be a value of "1".

The result of logically OR'ing bitmap 500 with the bitmap 302 of the corresponding priority level indicates whether an LBA has the corresponding priority level. The indication is analogous to the discussion above regarding bitmaps 302, although the value used to determine whether the LBA has the corresponding priority level is the result of the logical OR'ing of the two bitmaps rather than just bitmap 302. By logically OR'ing bitmap 500 with the bitmap 302 of the corresponding priority level, LBAs accessed while the device is operating in a power saving mode are assigned the corresponding priority level even if the LBAs are assigned a lower priority level by another device or module.

Returning to FIG. 2, it should be noted that LBA priority record 204 can be implemented in other manners rather than using bitmaps for standard record 214 and/or power saving mode record 216. For example, various other lists, trees, or other data structures can be used to record which LBAs are assigned which priorities and/or which LBAs are accessed (e.g., read from) while the device is operating in a power saving mode. Such a record can be, for example, a list or array of tuples including the starting LBA, count of LBAs and I/O type (read and/or write) for each I/O that happened while the device is operating in a power saving mode. It should further be noted that LBA priority record 204 need not include standard record 214. In such situations, priority identification module 202 can obtain priority levels assigned to LBAs in different manners (e.g., determine the priority levels as the LBAs are accessed), and use power saving mode record 216 to continue to assign LBAs that are accessed (e.g., read from) while the device is operating in a power saving mode at the appropriate priority level (e.g., priority level 2 in the examples discussed above).

In one or more embodiments, power saving mode record 216 maintains an indication of LBAs accessed (e.g., read from) over a particular time frame while the device is operating in a power saving mode. The particular time frame can be, for example, a particular number of days or weeks, such as two weeks. The indication can be maintained in a variety of different manners. For example, the power saving mode record 216 can be a bitmap and different bitmaps can be used to identify whether LBAs are accessed while the device is in a power saving mode over different time frames (e.g., hourly, daily, etc.). These different bitmaps can then be combined (e.g., logically OR'd) to determine which LBAs are accessed over a particular time frame. E.g., a different bitmap can be generated each day identifying LBAs accessed while the device is in a power saving mode during the day, and the daily bitmaps over a two-week period logically OR'd to determine which LBAs are accessed over that two-week period.

Alternatively, the indication of LBAs accessed (e.g., read from) over a particular time frame can be maintained in different manners. For example, for each indication of an LBA that is accessed (e.g., each cell in a bitmap or each entry in another data structure), a timestamp or other indication can be associated with the indication identifying a date and/or time when the LBA was accessed. Given these timestamps, an indication of which LBAs are accessed over a particular time frame can be readily determined.

As discussed above, the LBAs that are accessed while the device implementing drive access system 200 is operating in a power saving mode are indicated by power saving mode record 216. Power saving mode record 216 can optionally be pre-populated with indications of LBAs likely to be accessed while the device is operating in a power saving mode. The LBAs likely to be accessed while the device is operating in a power saving mode can be determined by a developer of drive access system 200 and/or an operating system of the device, such as determined empirically, based on popular programs (e.g., LBAs of popular programs), and so forth. By pre-populating power saving mode record 216 with indications of LBAs likely to be accessed while the device is operating in a power saving mode, the likelihood of performance part 112 including LBAs accessed in a power saving mode are increased even in situations where the device has not yet entered a power saving mode.

For example, if a program on the device is playing back music, the LBAs storing music data (e.g., in a playlist currently being played back) can be identified as LBAs likely to be accessed while the device is operating in a power saving mode and thus power saving mode record 216 can be pre-populated with indications of such LBAs. The device may later be in a power saving mode, and appear to the user to be otherwise turned off or in a power saving mode while playing back the music, and the likelihood of performance part 112 including such LBAs is increased due to indications of such LBAs being included in power saving mode record 216.

In one or more embodiments, drive access system 200 supports four priority levels, labeled as: Priority Level Q, Priority Level R, Priority Level S, Priority Level T, and Priority Level U. Priority Level Q is the highest priority level, Priority Level R is the next highest priority level (one level below Priority Level Q), Priority Level S is the next highest priority level (one level below Priority Level Q), Priority Level T is the next highest priority level (one level below Priority Level U), and Priority Level U is the lowest priority level. LBAs for I/O accesses during booting of the computing device are assigned Priority Level Q. LBAs for I/O accesses when swapping a memory page file to or from the hybrid drive are assigned Priority Level R. LBAs for I/O accesses while putting the computing device into hibernation are assigned Priority Level R (or alternatively Priority Level Q). LBAs for I/O accesses during launching of applications run in the foreground are assigned Priority Level S, and LBAs for I/O accesses during launching of applications not run in the foreground are assigned Priority Level T. LBAs read from while the computing device is operating in a power saving mode are assigned Priority Level S, and LBAs written to while the computing device is operating in a power saving mode are assigned Priority Level U. LBAs accessed when the computing device is going into or coming out of a standby mode, when a user is logging on to or off of the computing device, or when switching between current users on the computing device are assigned Priority Level S. Other LBAs not assigned to Priority Level Q, R, or S can be assigned to Priority Level T, or alternatively can be assigned no priority level to indicate that such other LBAs are to be stored in base part 114 rather than performance part 112.

Priority identification module 202 is discussed as obtaining priority levels for LBAs. Module 202 can obtain priority levels, and LBA priority record 204 can provide indications of priority levels, for LBAs on a per user basis or a per computing device basis. Thus, module 202 can obtain priority levels for LBAs for individual users of the computing device implementing drive access system 200, or alternatively can obtain a single set of priority levels for LBAs for all users of the computing device.

It should further be noted that situations can arise where the number of priority levels supported by priority identification module 202 and/or LBA priority record 204 is greater than the number of priority levels supported by hybrid drive 102. In such situations, the priority levels used by drive access system 200 are mapped to the priority levels used by hybrid drive 102. The specific mapping can vary based on the number of priority levels that are supported, the desires of the developer of drive access system 200, the desires of an administrator or user of the computing device implementing drive access system 200, and so forth. This mapping can occur at various times, such as when priority levels for LBAs are determined (thus, for example, LBA priority record 204 would include bitmaps for the priority levels supported by hybrid drive 102), when the priority level for an LBA is determined or otherwise obtained so that I/O module 206 can include the indication in an I/O access to hybrid drive 102, and so forth.

It should also be noted that the hybrid drive implements a technique referred to as on-demand caching. Priority levels are assigned to LBAs and the priority level for a given LBA is indicated to hybrid drive 102 along with the I/O access for that LBA. Hybrid drive 102 is thus able to store the data for the I/O access in the appropriate part 112 or 114 based on the indicated priority level. Performance part 112 need not be pre-populated with LBAs that are assigned higher priority levels, but rather can be populated as appropriate based on priority levels indicated in received I/O accesses, and can automatically adjust over time if priority levels assigned to various LBAs change.

However, it should be further noted that in some situations performance part 112 can be pre-populated with data for LBAs. For example, when hybrid drive 102 is first installed on a computing device or the computing device including hybrid drive 102 is built, hybrid drive 102 can be pre-populated with data that is expected to be higher priority. This data that is expected to be higher priority can be determined in different manners, such as based on knowledge of priority levels assigned to LBAs of other computing devices, based on knowledge of the developer or manufacturer of the computing device, and so forth. However, the priority levels assigned to LBAs for such pre-populated data need not, and typically do not, have the same priority levels as are obtained by priority identification module 202. For example, performance part 112 can be pre-populated with data for LBAs and automatically assigned the lowest priority level, which can subsequently be changed by hybrid drive 102 as I/O accesses are received from I/O module 206.

FIG. 6 is a flowchart illustrating an example process 600 for power saving mode hybrid drive access management in accordance with one or more embodiments. Process 600 is carried out by a drive access system, such as drive access system 200 of FIG. 2, and can be implemented in software, firmware, hardware, or combinations thereof. Process 600 is shown as a set of acts and is not limited to the order shown for performing the operations of the various acts. Process 600 is an example process for power saving mode hybrid drive access management; additional discussions of power saving mode hybrid drive access management are included herein with reference to different figures.

In process 600, priority levels are assigned to multiple groups of data accessed by issuing one or more I/O commands to a hybrid drive while the device implementing the drive access system is operating in a power saving mode (act 602). Different priority levels can be assigned in act 602, and the priority level for groups of data being read from the hybrid drive are assigned a priority level that is at least the lowest priority level supported by the drive access system (e.g., a priority level that is the lowest priority level supported by the drive access system or a priority level that is higher than the lowest priority level supported by the drive access system) as discussed above.

Indications of the priority levels for the groups of data are communicated to the hybrid drive as I/O commands are issued to the hybrid drive (act 604). Each I/O command accessing a particular group of data includes an indication of the priority level for that group of data as discussed above. The priority level for each group of data provides an indication to the hybrid drive whether the hybrid drive is expected to store the group of data in the performance part of the hybrid drive, although the hybrid drive is not bound to the indicated priority level and is not obligated to store any particular group of data in the performance part as discussed above. The priority level assigned to a group of data as a result of the group of data being accessed (e.g., read) while the computing device is operating in a power saving mode remains the priority level assigned to the group of data, even if the computing device is no longer operating in the power saving mode.

Figure 7:
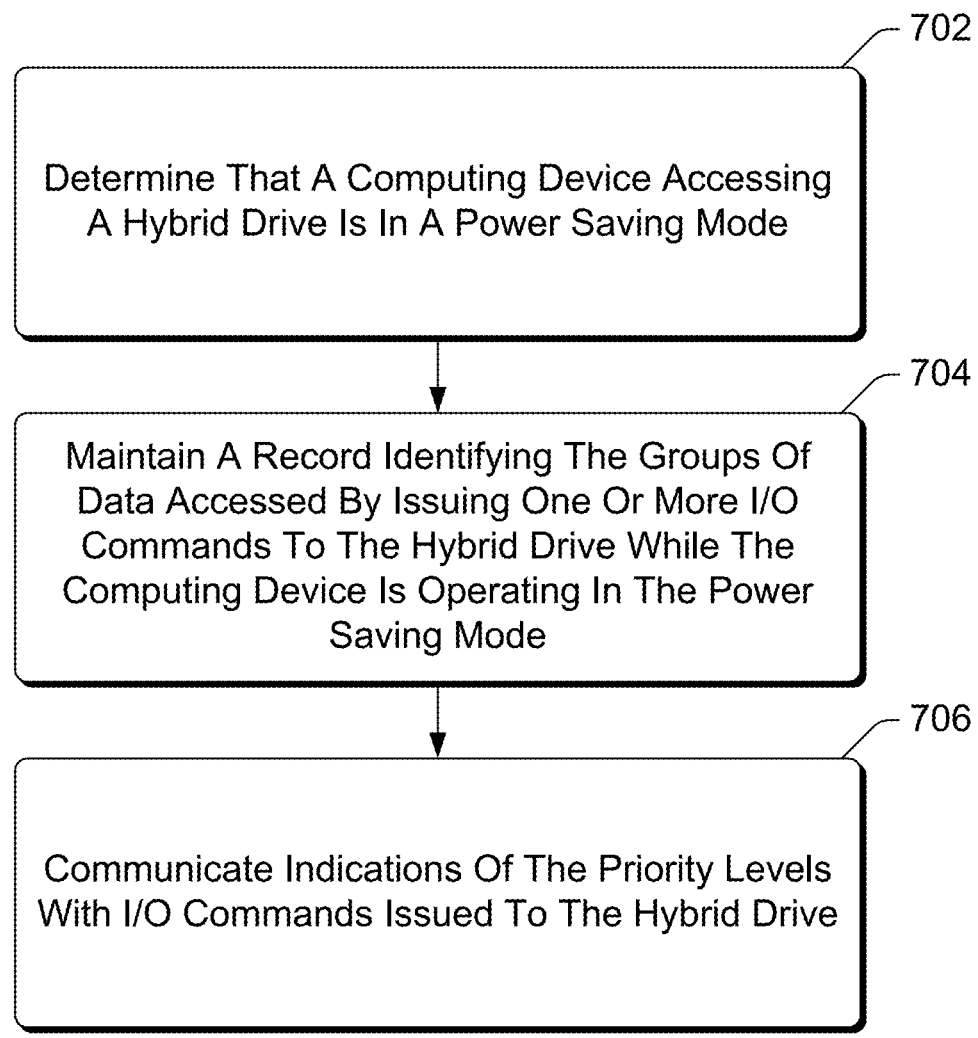
FIG. 7 is a flowchart illustrating another example process for power saving mode hybrid drive access management in accordance with one or more embodiments.

FIG. 7 is a flowchart illustrating another example process 700 for power saving mode hybrid drive access management in accordance with one or more embodiments. Process 700 is carried out by a drive access system, such as drive access system 200 of FIG. 2, and can be implemented in software, firmware, hardware, or combinations thereof. Process 700 is shown as a set of acts and is not limited to the order shown for performing the operations of the various acts. Process 700 is an example process for power saving mode hybrid drive access management; additional discussions of power saving mode hybrid drive access management are included herein with reference to different figures.

In process 700, a determination is made that the device implementing the drive access system is operating in a power saving mode (act 702). The determination can be made in a variety of different manners as discussed above.

A record identifying the groups of data accessed by issuing one or more I/O commands to the hybrid drive while the device is operating in the power saving mode is maintained (act 704). This record can be take various different forms, and can be one or more bitmaps as discussed above.

Indications of the priority levels for the groups of data are communicated to the hybrid drive as I/O commands are issued to the hybrid drive (act 706). Each I/O command accessing a particular group of data includes an indication of the priority level for that group of data, analogous to act 604 of FIG. 6 discussed above.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Although particular functionality is discussed herein with reference to particular modules, it should be noted that the functionality of individual modules discussed herein can be separated into multiple modules, and/or at least some functionality of multiple modules can be combined into a single module.

Figure 8:
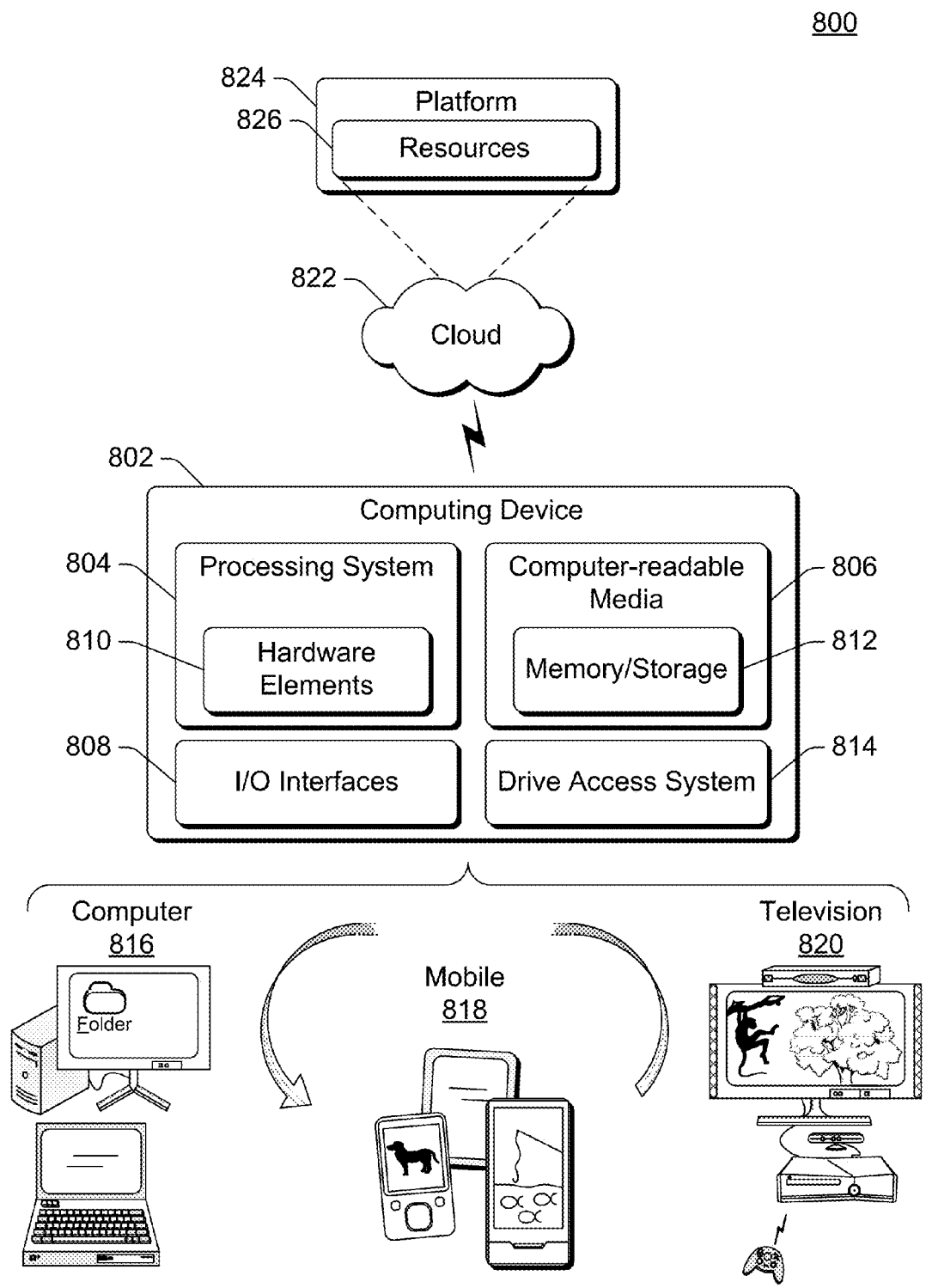
FIG. 8 illustrates an example system that includes an example computing device that is representative of one or more systems and/or devices that may implement the various techniques described herein.

FIG. 8 illustrates an example system generally at 800 that includes an example computing device 802 that is representative of one or more systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O Interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 802 may be configured in a variety of ways as further described below to support user interaction.

Computing device 802 also includes a drive access system 814. Drive access system 814 provides various functionality, including determining priority levels for LBAs as discussed above. Drive access system 814 can implement, for example, drive access system 200 of FIG. 2.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 802 may assume a variety of different configurations, such as for computer 816, mobile 818, and television 820 uses. Each of these configurations includes devices that may have generally different constructs and capabilities, and thus the computing device 802 may be configured according to one or more of the different device classes. For instance, the computing device 802 may be implemented as the computer 816 class of a device that includes a personal computer, desktop computer, a multi-screen computer, laptop computer, netbook, and so on.

The computing device 802 may also be implemented as the mobile 818 class of device that includes mobile devices, such as a mobile phone, portable music player, portable gaming device, a tablet computer, a multi-screen computer, and so on. The computing device 802 may also be implemented as the television 820 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This functionality may also be implemented all or in part through use of a distributed system, such as over a "cloud" 822 via a platform 824 as described below.

The cloud 822 includes and/or is representative of a platform 824 for resources 826. The platform 824 abstracts underlying functionality of hardware (e.g., servers) and software resources of the cloud 822. The resources 826 may include applications and/or data that can be utilized while computer processing is executed on servers that are remote from the computing device 802. Resources 826 can also include services provided over the Internet and/or through a subscriber network, such as a cellular or Wi-Fi network.

The platform 824 may abstract resources and functions to connect the computing device 802 with other computing devices. The platform 824 may also serve to abstract scaling of resources to provide a corresponding level of scale to encountered demand for the resources 826 that are implemented via the platform 824. Accordingly, in an interconnected device embodiment, implementation of functionality described herein may be distributed throughout the system 800. For example, the functionality may be implemented in part on the computing device 802 as well as via the platform 824 that abstracts the functionality of the cloud 822.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   assigning one of multiple priority levels to groups of data accessed by issuing one or more input/output (I/O) commands to a hybrid drive while a computing device is operating in a power saving mode, the hybrid drive including both a performance part and a base part in which groups of data can be stored, the one of the multiple priority levels comprising a priority level that is at least a lowest priority level of the multiple priority levels to reduce accesses to the base part while the computing device is operating in the power saving mode, the lowest priority level being assigned to a particular group of data so that an amount of data at the lowest priority level in the performance part of the hybrid is greater than an amount of data in at least one other of the multiple priority levels, the lowest priority level being a basis for transferring the particular group of data between the performance part and the base part of the hybrid drive, and the assigning the one of the multiple priority levels being based at least in part on whether the one or more I/O commands to the hybrid drive are associated with a read request or a write request; and communicating, to the hybrid drive, an indication of the assigned one of the multiple priority levels of the groups of data accessed by issuing one or more I/O commands to the hybrid drive while the computing device is in the power saving mode.

2. A method as recited in claim 1, the power saving mode comprising a connected standby mode.

3. A method as recited in claim 1, the hybrid drive transferring groups of data assigned lower priority levels from the performance part to the base part prior to transferring data assigned higher priority levels from the performance part to the base part.

4. A method as recited in claim 1, the assigning comprising assigning a priority level higher than the lowest priority level to groups of data accessed by I/O commands reading data from the hybrid drive, and assigning a different priority level to groups of data accessed by I/O commands writing data to the hybrid drive.

5. A method as recited in claim 4, the different priority level comprising the lowest priority level.

6. A method as recited in claim 1, the one of the multiple priority levels assigned to each group of data providing an indication to the hybrid drive whether the hybrid drive is expected to store the group of data in the performance part.

7. A method as recited in claim 1, further comprising:
maintaining a record of groups of data accessed by issuing one or more I/O commands to the hybrid drive over a particular time frame and while the computing device is operating in the power saving mode; and
assigning priority levels to groups of data based at least in part on the record.

8. A method as recited in claim 7, the particular time frame comprising a particular number of hours, days, or weeks.

9. A method as recited in claim 7, the record comprising a bitmap including multiple cells indicating which groups of data were read from the hybrid drive during the particular time frame and while the computing device was operating in the power saving mode.

10. A method as recited in claim 1, the performance part being higher performance than the base part.

11. A method as recited in claim 1, the one of the multiple priority levels comprising a same priority level as is assigned to groups of data accessed when a user is logging on to or off of the computing device.

12. A method comprising:
determining that a computing device is operating in a power saving mode, the computing device accessing a hybrid drive that includes both a performance part and a base part in which groups of data can be stored; and
maintaining a record identifying groups of data accessed by issuing one or more input/output (I/O) commands to the hybrid drive while the computing device is operating in the power saving mode, the groups of data accessed while the computing device is operating in the power saving mode being assigned one of multiple priority levels, the multiple priority levels including a lowest priority level to reduce accesses to the base part while the computing device is in the power saving mode, the lowest priority level being assigned to a particular group of data so that an amount of data at the lowest priority level in the performance part of the hybrid is greater than an amount of data in at least one other of the multiple priority levels, the lowest priority level being a basis for transferring the particular group of data between the performance part and the base part of the hybrid drive, and the record identifying the multiple priority levels in dependence upon an I/O type associated with the one or more I/O commands to the hybrid drive.

13. A method as recited in claim 12, further comprising communicating an indication of the one priority level to the hybrid drive with I/O commands issued to the hybrid drive reading the groups of data identified by the record regardless of whether the computing device is operating in the power saving mode.

14. A method as recited in claim 12, the power saving mode comprising a connected standby mode.

15. A method as recited in claim 12, the hybrid drive transferring groups of data assigned lower priority levels from the performance part to the base part prior to transferring data assigned higher priority levels from the performance part to the base part.

16. A method as recited in claim 12, the groups of data read while the computing device is operating in the power saving mode being assigned a priority level higher than the lowest priority level, and the groups of data written to while the computing device is operating in the power saving mode being assigned the lowest priority level.

17. A method as recited in claim 12, the one of the multiple priority levels assigned to a group of data providing an indication to the hybrid drive whether the hybrid drive is expected to store the group of data in the performance part.

18. A method as recited in claim 12, the maintaining the record comprising maintaining the record identifying groups of data accessed by issuing one or more I/O commands to the hybrid driver over a particular time frame and while the computing device is operating in the power saving mode.

19. A method as recited in claim 18, the record comprising a bitmap including multiple cells indicating which groups of data were read from the hybrid drive during the particular time frame and while the computing device was operating in the power saving mode.

20. A computing device comprising:
one or more processors; and
one or more computer-readable media having stored thereon multiple instructions that, when executed by the one or more processors, cause the one or more processors to:
determine that the computing device is operating in a power saving mode, the computing device accessing a hybrid drive that includes both a performance part and a base part in which groups of data can be stored;
assign one of multiple priority levels to groups of data accessed by issuing one or more input/output (I/O) commands to the hybrid drive while the computing device is operating in the power saving mode, the one of the multiple priority levels comprising a priority level higher than a lowest priority level of the multiple priority levels to reduce accesses to the base part while the computing device is in the power saving mode, the lowest priority level being assigned to a particular group of data so that an amount of data at the lowest priority level in the performance part of the hybrid is greater than an amount of data in at least one other of the multiple priority levels, the lowest priority level being a basis for moving the particular group of data between the performance part and the base part of the hybrid drive, and the assigning the one of the multiple priority levels being based at least in part on whether the one or more I/O commands to the hybrid drive are associated with a read request or a write request; and
maintain a record of groups of data accessed by issuing one or more I/O commands to the hybrid drive over a particular time frame and while the computing device is operating in the power saving mode.

* * * * *